US006745620B2

(12) United States Patent
Kreikemeier et al.

(10) Patent No.: US 6,745,620 B2
(45) Date of Patent: Jun. 8, 2004

(54) AUTOMATIC TUNING OF FUEL INJECTED ENGINES

(75) Inventors: Michael L Kreikemeier, Belgrade, MT (US); Lester Meeks, Belgrade, MT (US)

(73) Assignee: Dynojet Research, Inc., Belgrade, MT (US)

( * ) Notice: Subject to any disclaimer, the term of this patent is extended or adjusted under 35 U.S.C. 154(b) by 88 days.

(21) Appl. No.: 10/078,288

(22) Filed: Feb. 18, 2002

(65) Prior Publication Data

US 2002/0170549 A1 Nov. 21, 2002

Related U.S. Application Data

(60) Provisional application No. 60/269,691, filed on Feb. 17, 2001.

(51) Int. Cl.[7] ............................ F02D 41/14; G01L 3/20

(52) U.S. Cl. ...................... 73/117.3; 123/674; 123/486; 701/104

(58) Field of Search ................................ 123/674, 486; 701/103, 104, 109; 73/117.3, 119 A

(56) References Cited

U.S. PATENT DOCUMENTS

| | | | | | |
|---|---|---|---|---|---|
| 4,306,449 | A | * | 12/1981 | Hoffman | 73/116 |
| 4,760,830 | A | * | 8/1988 | Bullis et al. | 73/117.3 |
| 4,870,585 | A | * | 9/1989 | Manzolini | 73/117 |
| 5,119,304 | A | * | 6/1992 | Seki | 73/117.3 |
| 5,445,014 | A | * | 8/1995 | Fiorenzal et al. | 73/117.3 |
| 6,006,611 | A | * | 12/1999 | Galvin et al. | 73/862.16 |
| 6,079,258 | A | * | 6/2000 | List et al. | 73/117.3 |
| 6,085,142 | A | * | 7/2000 | Di Leo et al. | 701/104 |
| 6,338,018 | B1 | * | 1/2002 | Baker | 701/104 |

* cited by examiner

*Primary Examiner*—Erick Solis
(74) *Attorney, Agent, or Firm*—Allan Jacobson

(57) ABSTRACT

A method and apparatus for automatic tuning of fuel injected engines includes an air-fuel ratio sensor, a load device for controlling engine RPM, a digital computer and a display device. The digital computer displays a plurality of throttle positions to an operator who sets the throttle of said engine to correspond to said display of throttle position. The digital computer varies the engine RPM over the operating range of the engine to determine corresponding map values for storage in an injector signal modifier.

10 Claims, 4 Drawing Sheets

AUTOMATIC TUNING OF FUEL INJECTED ENGINES

This application claims the benefit of Provisional Application No. 60/269,691, filed Feb. 17, 2001.

FIELD OF THE INVENTION

The present invention relates to the automatic adjustment of the air-fuel ratio (AFR) of an electronic fuel injected vehicle/engine to a target value using a vehicle/engine load device, a fuel flow modifying apparatus and a programmed digital computer.

BACKGROUND OF THE INVENTION

The function of an electronic fuel injection system is to control an engine's air-fuel ratio to appropriate target specifications. In an engine that is operating under normal conditions, the air-fuel ratio should be controlled to remain within acceptable limits. Changing other engine operating conditions such as valve timing or the exhaust system design to enhance vehicle performance can alter the air-fuel ratio significantly. In order to optimize vehicle performance under these new engine operating conditions, the fuel flow to the engine must be modified to re-establish an appropriate target air-fuel ratio over the operating range of the vehicle.

After an engine reaches operating temperature, there are two primary variables that establish the operating condition, (1) the throttle position (as a function of percent open) and (2) the crankshaft speed in revolutions per minute (RPM).

Throttle position (expressed as a percentage of open) controls the flow of air into the engine by restricting intake air flow. At 0 percent throttle position the air flow is restricted sufficiently to keep the engine idling with no load. At 100 percent throttle position, the air flow restriction is at a minimum, thereby allowing the engine to develop maximum torque. Crankshaft speed (RPM) is directly related to the amount of air the engine pulls through the throttle body. The higher the RPM, the higher the air flow into the engine. The combination of throttle position and RPM determines the flow rate of air into the engine.

The electronic fuel injection system controls the fuel flow into the engine. The Engine Control Unit (ECU) is the part of the electronic fuel injection system that controls the fuel flow rate by applying the proper control signals to the fuel injectors. The fuel flow rate is based on a number of variables, two of which are throttle position and RPM. Typical engine control units do not allow adjustment of the internally stored fuel flow tables. However, as indicated above, adjustment of fuel flow may become necessary when performance enhancements are added to the vehicle/engine.

One type of fuel flow modifying apparatus is an injector signal modifier (ISM). Injector signal modifiers are available to modify the relationship of the engine control unit signals to the fuel injectors thus allowing the adjustment of fuel flow. When applied to a fuel-injected engine, an injector signal modifier needs to be calibrated or mapped to adjust fuel flow for a range of throttle positions and RPM. The calibration or mapping process is referred to as "tuning" the fuel injection system. An operator controls engine load, throttle position and RPM. The operator observes the air-fuel ratio (or some other parameter, such as oxygen ($O_2$) in the exhaust, that is indicative of the air-fuel ratio) and adjusts the internally stored table (map) in the injector signal modifier. The procedure is repeated for all operating conditions, which results in a long and tedious fuel injector tuning operation.

In particular, the manual tuning of a fuel injection system in the prior art consists of setting the RPM of the engine to a fixed level, then advancing the throttle from one fixed position to the next. At each throttle position for the same engine RPM, the stored value in the corresponding cell of the injector signal modifier is adjusted by the operator to achieve the target air to fuel ratio.

SUMMARY OF THE INVENTION

The present invention is embodied in a method and apparatus for automatic tuning of fuel injected engines. In one embodiment of the present invention, the fuel injection system is tuned by holding the engine throttle in a first position and having a digital computer vary the engine RPM. For each value of engine RPM, the corresponding cell of the map is computed for storage in the injector signal modifier map. After all values of engine RPM had been attained, the operator is instructed by the digital computer to advance the throttle to a second position. While the throttle is in the second position the engine RPM is varied between lowest and highest values over the engine operating range. For each value of engine RPM (while at the second throttle position), the corresponding cell of the map is computed for storage in the injector signal modifier map. In such manner, for each value of throttle position and engine RPM, values for corresponding cells of the map are computed and stored in the injection signal modifier map to achieve fuel injection tuning.

DETAILED DESCRIPTION

Figure 1:
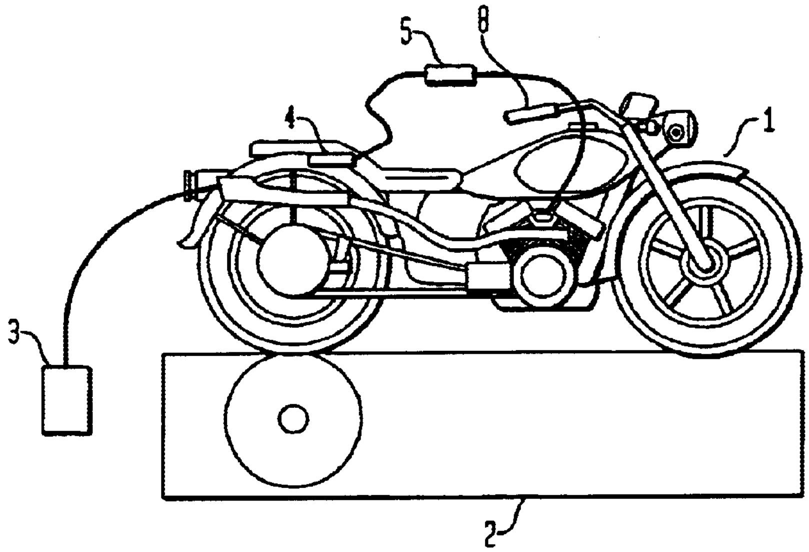
FIG. 1 (PRIOR ART)
FIG. 1 shows a prior art system for manually tuning fuel injected engines.

The manual arrangement of the prior art includes hardware to adjust the air-fuel ratio for the various operating conditions. FIG. 1 shows a vehicle 1 mounted on a load device 2. An air-fuel ratio sensor 3 samples the exhaust gasses. The probe of the air-fuel ratio sensor 3 is placed in the exhaust pipe of the engine to monitor the amount of oxygen ($O_2$) in the exhaust gasses. The air-fuel ratio sensor 3 determines the air-fuel ratio in the engine combustion chamber from a measurement of the concentration of $O_2$ in the exhaust gasses.

The engine control unit 4 controls the fuel flow to the engine fuel injectors. An injector signal modifier 5 is placed between the engine control unit 4 and the engine fuel injectors. The injector signal modifier 5 alters the signals received from the engine control unit 4 and sends such modified signals to the engine fuel injectors. The present invention is directed to the automatic adjustment (tuning) of the internal parameters of the injector signal modifier 5 so as to optimize engine performance.

The following table 1 is a "map" of how the injector signal modifier 5 modifies the air-fuel ratio. Across the top row of the map is throttle position. The left column is engine RPM. The zeros in the each of the "cells" of the map signify that the injector signal modifier 5 will make zero change at each operating condition (at each given TP and RPM). When all cells of the map are set to zero, the injector signal modifier will not modify the signals to the fuel injectors. Consequently the fuel flow as set by the vehicle's engine control unit 4 remains unchanged by the injector signal modifier 5. The unprogrammed state of the injector signal modifier 5 is shown in table 1 below.

TABLE 1

| RPM/TP% | | $TP_1$ 0 | $TP_2$ 10 | $TP_3$ 20 | $TP_4$ 50 | $TP_5$ 80 | $TP_6$ 100 |
|---|---|---|---|---|---|---|---|
| $RPM_1$ | 1000 | 0 | 0 | 0 | 0 | 0 | 0 |
| $RPM_2$ | 1500 | 0 | 0 | 0 | 0 | 0 | 0 |
| $RPM_3$ | 2000 | 0 | 0 | 0 | 0 | 0 | 0 |
| $RPM_4$ | 2500 | 0 | 0 | 0 | 0 | 0 | 0 |
| $RPM_5$ | 3500 | 0 | 0 | 0 | 0 | 0 | 0 |
| $RPM_6$ | 4000 | 0 | 0 | 0 | 0 | 0 | 0 |

In order modify the air-fuel ratio to a desired value, the vehicle is operated at each operating condition represented by each cell (each given TP and RPM). At each engine operating condition, there is a desired target value for the air-fuel ratio. The injector signal modifier is set to either increase or decrease the air-fuel ratio. To increase the air-fuel ratio, the injector signal modifier is set to decrease the fuel flow to the fuel injectors. To decrease the air-fuel ratio, the injector signal modifier is set to increase the fuel flow to the fuel injectors. The operator modifies the value in each cell while at the same time monitoring the air-fuel ratio sensor 3. A positive value placed in a cell of the injector signal modifier 5 represents a percentage increase of the nominal value of fuel flow from the engine control unit 4. A negative value placed a cell of the injector signal modifier 5 represents a percentage decrease of the nominal value of fuel flow from the engine control unit 4. The cell value is changed until the desired target for air-fuel ratio is attained.

Figure 3:
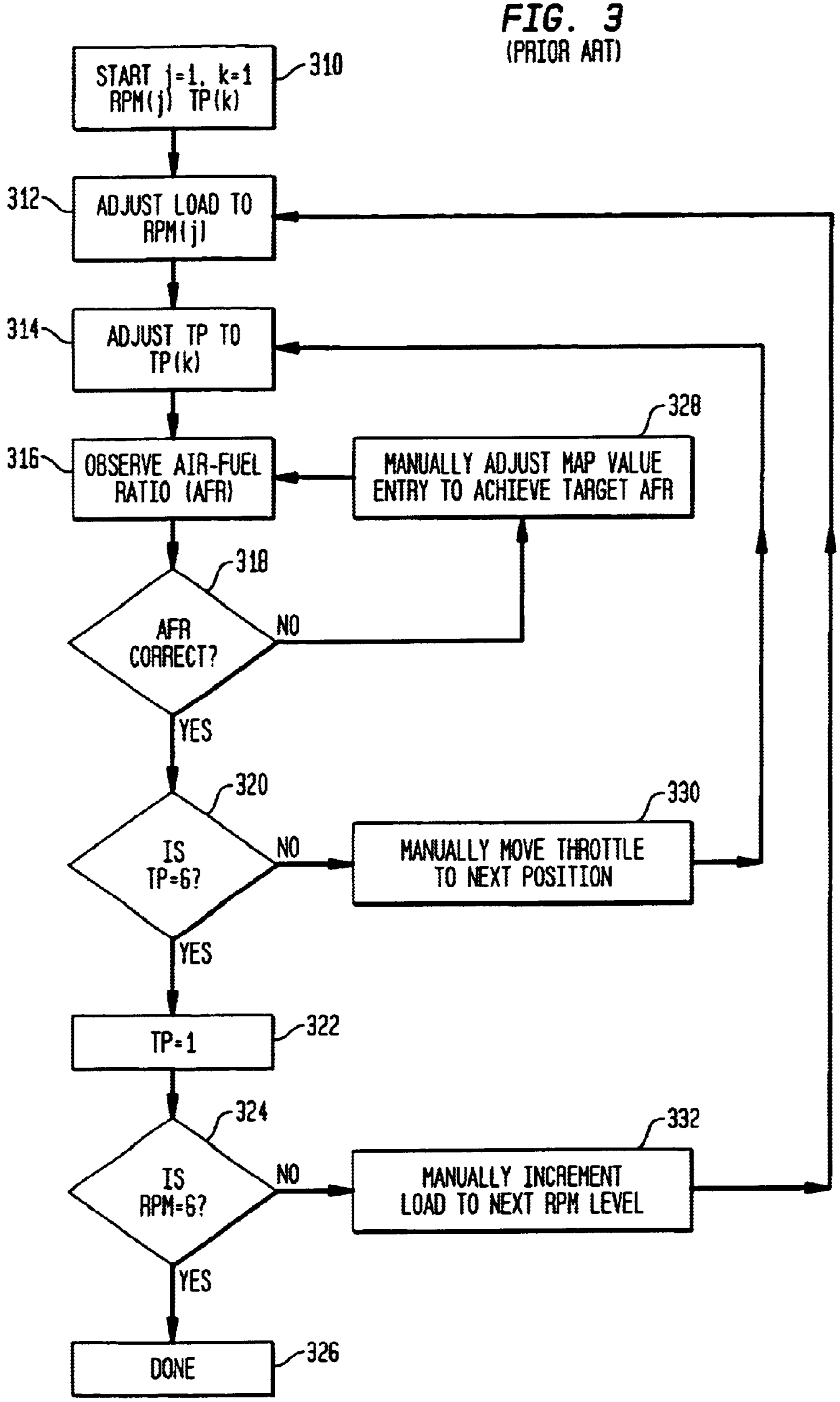
FIG. 3 (PRIOR ART)
FIG. 3 is a flow chart diagram for manually tuning fuel injected engines in accordance with the prior art.

The typical manual procedure followed by the operator to adjust the air-fuel ratio of the vehicle is shown in the flow chart of FIG. 3. The system is initialized at step 310. First, the load device 2 is adjusted at step 312 to a hold a steady first engine speed, $RPM_1$. The operator controls the throttle 8 (from FIG. 1) to hold a first throttle position $TP_1$ at step 314. Then, at constant $RPM_1$, for each throttle position, starting at $TP_1$ and progressing to $TP_6$, the air-fuel ratio is adjusted 316, 318, 328 to its target value. That is, first $RPM_1$ is preset and the air-fuel ratio is manually adjusted 316, 318, 328 for $TP_1$, $TP_2$, $TP_3$, $TP_4$, $TP_5$ and $TP_6$, until the air-fuel ratio has been adjusted 320, 330 for all throttle positions $TP_1$ to $TP_6$.at $RPM_1$. Then, the RPM level (engine load) is incremented manually 322, 324, 332, 312 to the next level and the adjustment process is again repeated for each throttle position in succession, $TP_1$ to $TP_6$.

In such manner, the injector signal modifier map is filled in row by row for each value of RPM. In each case, the operator observes the air-fuel sensor 3, and for each throttle position adjusts the value in each cell of the injector signal modifier map to achieve the desired target air-fuel ratio. The prior art manual procedure is slow, requiring many throttle position settings and the outcome 326 is operator dependent.

The injector signal modifier map after the tuning procedure may typically look like the following table 2:

TABLE 2

| RPM/TP% | | $TP_1$ 0 | $TP_2$ 10 | $TP_3$ 20 | $TP_4$ 50 | $TP_5$ 80 | $TP_6$ 100 |
|---|---|---|---|---|---|---|---|
| $RPM_1$ | 1000 | 5 | 7 | 0 | −3 | −5 | −7 |
| $RPM_2$ | 1500 | 5 | 5 | −2 | 0 | 0 | −3 |
| $RPM_3$ | 2000 | 5 | 3 | 0 | 0 | 1 | 0 |
| $RPM_4$ | 2500 | 2 | 5 | 4 | 5 | 3 | 3 |
| $RPM_5$ | 3500 | 1 | 7 | 8 | 12 | −5 | 5 |
| $RPM_6$ | 4000 | 2 | 3 | 9 | 11 | 6 | 5 |

Figure 2:
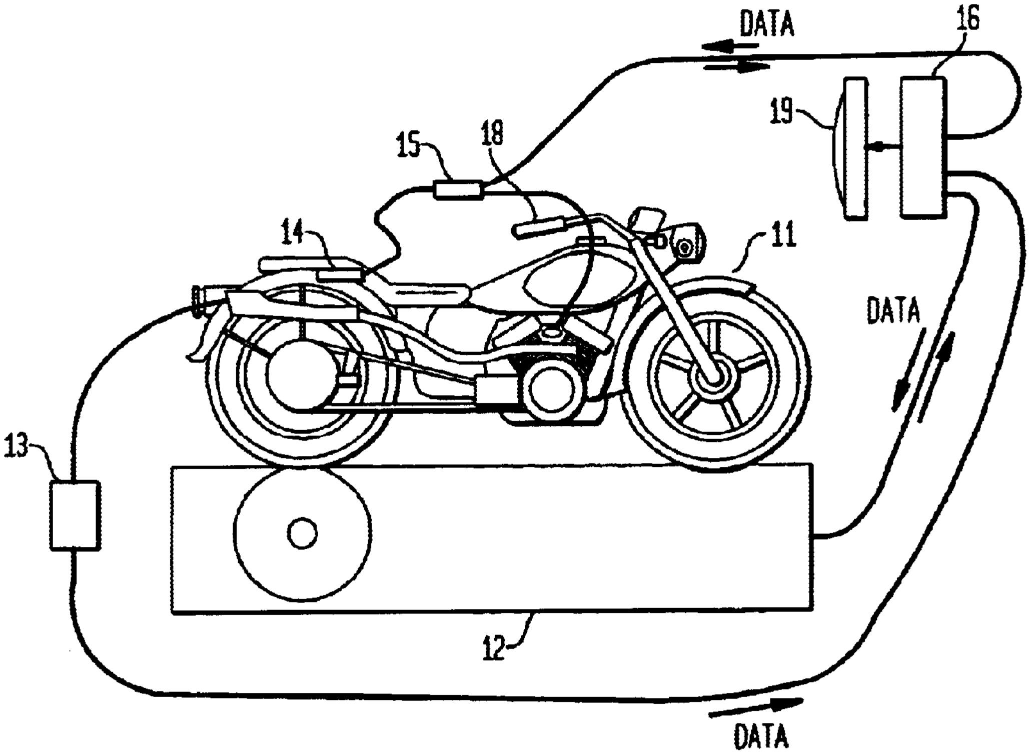
FIG. 2 is a system for automatic tuning of fuel injected engines in accordance with the present invention.

The present invention as shown in FIG. 2, automates the process for tuning the injector signal modifier 15. FIG. 2 shows a vehicle 11 mounted on a load device 12. The exhaust gas is sampled by an air-fuel ratio sensor 13, which is input to computer 16. The engine control unit 14 normally controls the fuel flow to the engine fuel injectors.

The injector signal modifier 15 modifies the fuel flow control signal from the engine control unit 14. The computer 16 further monitors the vehicle engine RPM from the load device 12. Finally, the computer 16 is coupled to the load device 12 in order to adjust the load on the vehicle 11 by setting the RPM. The air-fuel ratio is adjusted by changing individual cells in the injector signal modifier 15 map, which map is directly controlled by the computer 16. The procedure to adjust the air-fuel ratio of the vehicle illustrated in the system of FIG. 2 is shown in the flow charts of FIG. 4A and FIG. 4B.

Tuning Process Description:

In FIG. 2, the vehicle 11 is mounted on a load device 12, the injector signal modifier 15 is connected between the engine control unit 14 and the engine. In addition, the engine control unit is connected to the computer 16 that operates the load device 12. A display device 19 coupled to the computer 16 is visible to the operator. The air-fuel ratio module sensor 13 is applied to the exhaust system. The output of the air-fuel ratio sensor 13 is connected to the computer 16.

The operator sits on vehicle 11, starts the engine and shifts to the appropriate gear. The computer program/software in the computer 16 is initialized 410 (from FIG. 4A). The software in the computer 16 instructs the operator, via computer screen display 19, to hold the throttle 18 at a given position, TP(k) at step 412 (from FIG. 4A). While the operator holds a constant throttle position, the computer program instructs the load device 12 to hold the RPM of the engine at a first RPM setting corresponding to the first row, $RPM_1$, of the injector signal modifier map. The software then calculates value to be sent to the corresponding cell ($TP_1$, $RPM_1$). The cell value corresponds to the setting that will adjust the air-fuel ratio as measured by the air-fuel ratio module to the target value.

Figure 4A:
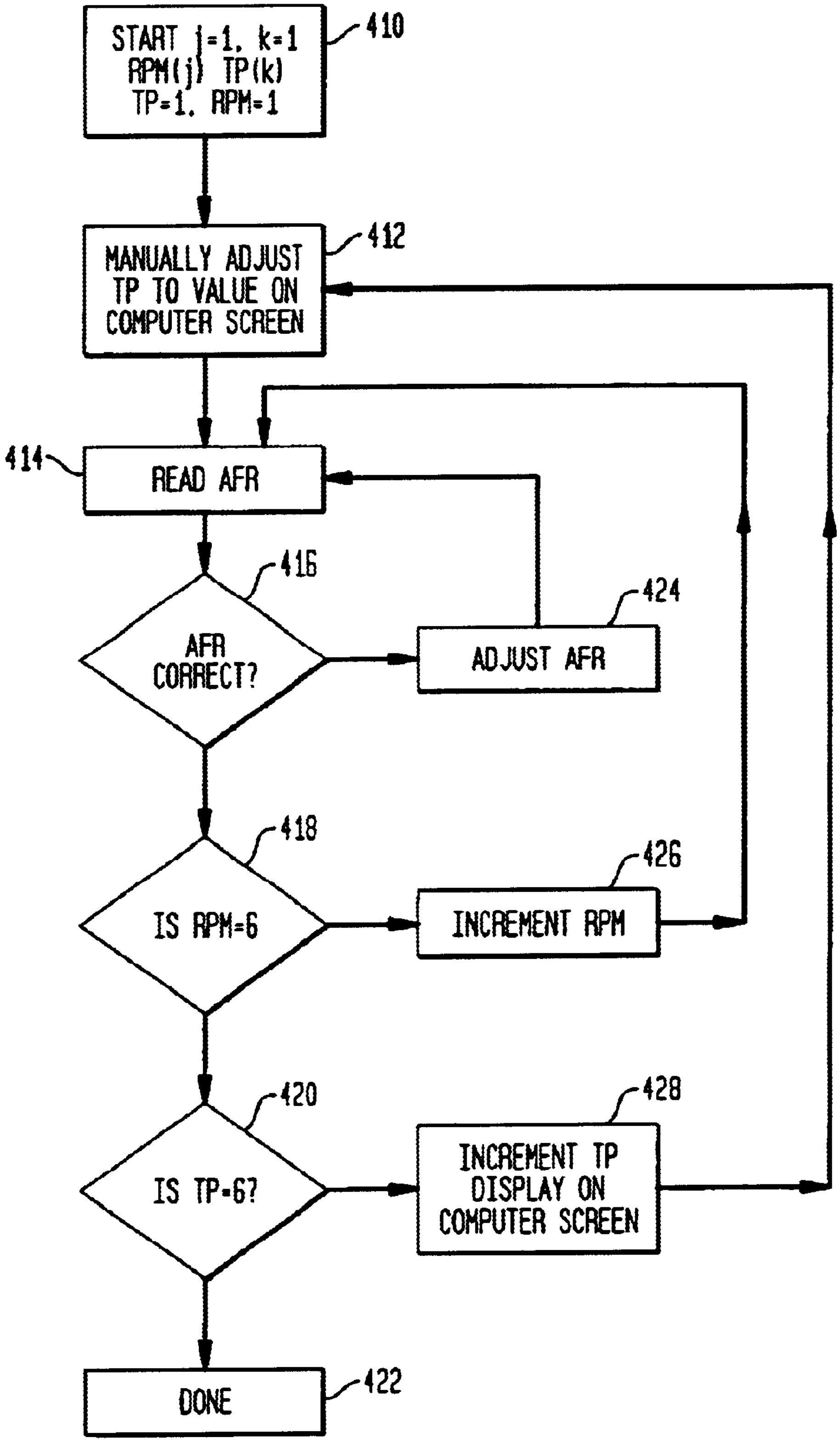
FIGS. 4A and 4B is a flow chart diagram for automatic tuning of fuel injected engines in accordance with the present invention.
Figure 4B:
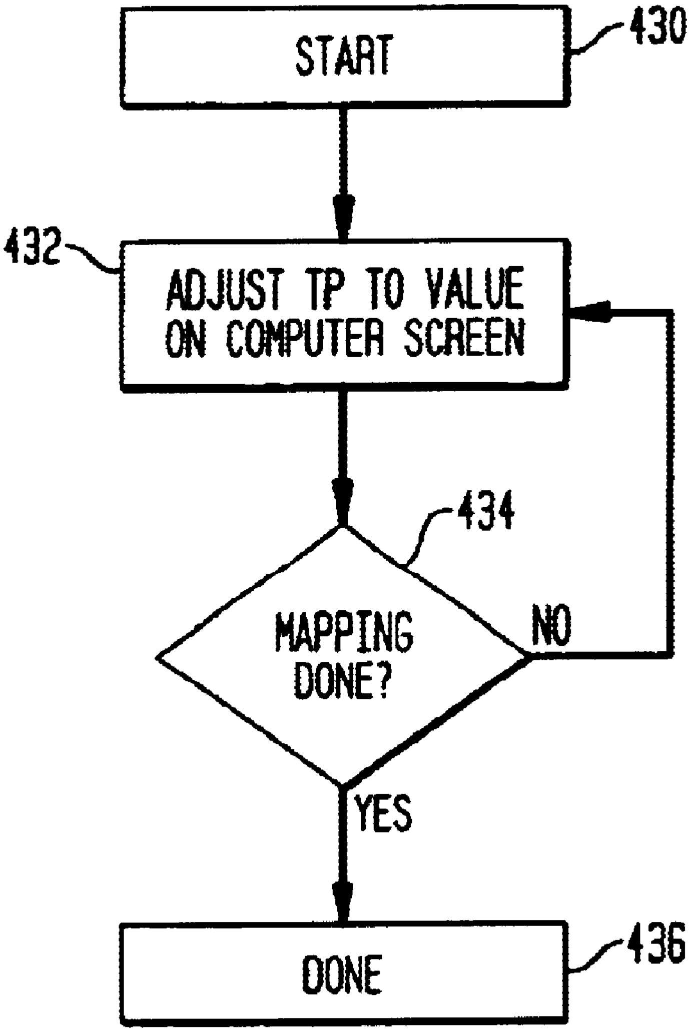

First, as shown in FIG. 4A, the air-fuel ratio is determined at step 414 by reading the value provided by the air-fuel ratio sensor 13. The determined air-fuel ratio is compared to a target value at step 416. If the air-fuel ratio is not correct, then an adjustment value is determined at step 424. The air-fuel ratio is again determined at step 414 and compared to the target value in step 416. When the air-fuel ratio has been correctly adjusted to the target value, the program then increments the RPM of the engine to $RPM_2$ at step 418, 426 and sets the corresponding cell in ($TP_1$, $RPM_2$) in the injector signal modifier.

The process is repeated for the next row of the injector signal modifier map until the first column of the injector signal modifier map corresponding to $TP_1$ is filled in.

Then the program instructs the operator to increment the throttle to a new throttle opening $TP_2$, 420, 428. The foregoing procedure is repeated for all throttle positions $TP_2$, $TP_3$, etc., until the air-fuel ratio is set to the target values in all cells of the injector signal modifier map. The injector signal modifier map is thus filled in column by column for each throttle position value. The operator need only watch the computer output display 19, and set throttle position, TP, in response. The computer 16 cycles through each value of RPM for each value of throttle position, and determines the corresponding cell contents for the injector signal modifier 15 map.

There are two modes of operation of the foregoing automatic tuning method to arrive at the same result. In one mode, the operator holds the throttle position 18 constant while the computer 16 steps from one constant value of engine RPM to the next. At each constant value of engine RPM, the computer 16 increases or decreases the flow of fuel to the fuel injectors until the $O_2$ sensor 13 indicates that the target air-fuel ratio has been achieved. In a second mode, the operator holds the throttle position 18 constant while the computer 16 steps from one constant value of engine RPM to the next and calculates the amount of increase or decrease in fuel flow would be needed to achieve the target air-fuel ratio.

In both modes of operation, after the tuning procedure is completed, the set of values that were determined or calculated during the tuning procedure is sent from the computer 16 and stored permanently in the injector signal modifier 15. The vehicle is removed from the load device 12. The vehicle engine will thereafter operate to the specifications defined in the injector signal modifier map.

In such manner, the cells of the injector signal modifier map are automatically, rapidly and accurately filled in so as to modify engine performance to achieve the desired air-fuel ratio targets. The resulting injector signal modifier map is similar to the manual results illustrated in table 2, but the tuning process is faster, more accurate and less operator dependent.

The present automated process has several advantages over the prior art manual procedure. The present system permits the in air-fuel ratio target values to be controlled by software to preset values. The present system results in more rapid adjustment of the air-fuel ratio over the operating range of the engine. The present system results in more accurate setting of the air-fuel ratio over the engine operating range.

What is claimed is:

1. In an internal combustion engine having fuel injectors and a fuel injection control system including an engine control unit, a throttle and an injector signal modifier for controlling said fuel injectors of said internal combustion engine responsive to said engine control unit, said injector signal modifier including an internally stored map for modifying a signal from said engine control unit as a function of said throttle position and said engine RPM, said map including a plurality of cells wherein each one of said plurality of cells corresponds to a given throttle position and given RPM value, a method using an air-fuel ratio sensor and a programmed digital computer for tuning said fuel injection control system to store corresponding values for said plurality of cells of said map, said method comprising:

selecting a first throttle position by said digital computer;

setting the throttle of said internal combustion engine to said first throttle position;

coupling a load to said internal combustion engine under the control of said digital computer so as to set said internal combustion engine to a first RPM level;

setting a value by said digital computer for a first cell of said map corresponding to said first throttle position and said first RPM level to provide an engine air-fuel ratio corresponding to a first target value;

coupling a load to said internal combustion engine under the control of said digital computer so as to set said internal combustion engine to a second RPM level; and setting a value by said digital computer for a second cell of said map corresponding to said first throttle position and said second RPM level to provide an engine air-fuel ratio corresponding to a second target value.

2. A method in accordance with claim 1, wherein said method further comprises:

selecting a second throttle position by said digital computer;

setting the throttle of said internal combustion engine to said second throttle position;

coupling a load to said internal combustion engine under the control of said digital computer so as to set said internal combustion engine to said first RPM level;

setting a value by said digital computer for a third cell of said map corresponding to said second throttle position and said first RPM level to provide an engine air-fuel ratio corresponding to a third target value; and coupling a load to said internal combustion engine under the control of said digital computer so as to set said internal combustion engine to said second RPM level;

setting a value by said digital computer for a fourth cell of said map corresponding to said second throttle position and said second RPM level to provide an engine air-fuel ratio corresponding to a fourth target value.

3. A method in accordance with claim 1, wherein said step of setting a value by said digital computer for a first cell of said map corresponding to said first throttle position and said first RPM level further comprises setting said value for said first cell responsive to said air-fuel ratio sensor indicating said first target value; and wherein said step of setting a value by said digital computer for a second cell of said map corresponding to said first throttle position and said second RPM level further comprises setting said value for said second cell responsive to said air-fuel ratio sensor indicating said second target value.

4. A method in accordance with claim 1, wherein said step of setting a value by said digital computer for a first cell of said map corresponding to said first throttle position and said first RPM level further comprises setting said value for said first cell to cause said air-fuel ratio sensor to indicate said first target value; and wherein said step of setting a value by said digital computer for a second cell of said map corresponding to said first throttle position and said second RPM level further comprises setting said value for said first cell to cause said air-fuel ratio sensor to indicate said second target value.

5. In an internal combustion engine having fuel injectors and a fuel injection control system including an engine control unit, a throttle and an injector signal modifier for controlling said fuel injectors of said internal combustion engine responsive to said engine control unit, said injector signal modifier including an internally stored map for modifying a signal from said engine control unit as a function of said throttle position and said engine RPM, said map including a plurality of cells wherein each one of said plurality of cells corresponds to a given throttle position and given RPM value, a method using an air-fuel ratio sensor and a programmed digital computer for tuning said fuel injection control system to store corresponding values for said plurality of cells of said map, said method comprising:

selecting a first throttle position by said digital computer, wherein said step of selecting first throttle position by said digital computer is performed by displaying an indication of said first throttle position to an operator;

setting the throttle of said internal combustion engine to said first throttle position, wherein said step of setting the throttle of said internal combustion engine to said first throttle position is performed by said operator setting the throttle of said internal combustion engine to said first throttle position;

coupling a load to said internal combustion engine under the control of said digital computer so as to set said internal combustion engine to a first RPM level; and setting a value by said digital computer for a first cell of said map corresponding to said first throttle position and said first RPM level to provide an engine air-fuel ratio corresponding to a first target value.

6. A method in accordance with claim 5, wherein said method further comprises:

coupling a load to said internal combustion engine under the control of said digital computer so as to set said internal combustion engine to a second RPM level;

setting a value by said digital computer for a second cell of said map corresponding to said first throttle position and said second RPM level to provide an engine air-fuel ratio corresponding to a second target value;

selecting a second throttle position by said digital computer, wherein said step of selecting second throttle position by said digital computer is performed by displaying an indication of said second throttle position to said operator;

setting the throttle of said internal combustion engine to said second throttle position, wherein said step of setting the throttle of said internal combustion engine to said second throttle position is performed by said operator setting the throttle of said internal combustion engine to said second throttle position;

coupling a load to said internal combustion engine under the control of said digital computer so as to set said internal combustion engine to said fast RPM level;

setting a value by said digital computer for a third cell of said map corresponding to said second throttle position and said first RPM level to provide an engine air-fuel ratio corresponding to a third target value; and coupling a load to said internal combustion engine under the control of said digital computer so as to set said internal combustion engine to said second RPM level;

setting a value by said digital computer for a fourth cell of said map corresponding to said second throttle position and said second RPM level to provide an engine air-fuel ratio corresponding to a fourth target value.

7. A method in accordance with claim 5, coupling a load to said internal combustion engine under the control of said digital computer so as to set said internal combustion engine to a second RPM level;

setting a value by said digital computer for a second cell of said map corresponding to said first throttle position and said second RPM level to provide an engine air-fuel ratio corresponding to a second target value;

wherein said step of setting a value by said digital computer for a first cell of said map corresponding to said first throttle position and said first RPM level further comprises setting said value for said first cell responsive to said air-fuel ratio sensor indicating said first target value; and wherein said step of setting a value by said digital computer for a second cell of said map corresponding to said first throttle position and said second RPM level further comprises setting said value for said second cell responsive to said air-fuel ratio sensor indicating said second target value.

8. A method in accordance with claim 5, coupling a load to said internal combustion engine under the control of said digital computer so as to set said internal combustion engine to a second RPM level;

setting a value by said digital computer for a second cell of said map corresponding to said first throttle position and said second RPM level to provide an engine air-fuel ratio corresponding to a second target value;

wherein said step of setting a value by said digital computer for a first cell of said map corresponding to said first throttle position and said first RPM level further comprises setting said value for said first cell to cause said air-fuel ratio sensor to indicate said first target value; and wherein said step of selling a value by said digital computer for a second cell of said map corresponding to said first throttle position and said second RPM level further comprises setting said value for said first cell to cause said air-fuel ratio sensor to indicate said second target value.

9. An automatic tuning apparatus for an internal combustion engine, said engine having fuel injectors and a fuel injection control system including an engine control unit, a throttle and an injector signal modifier for controlling said fuel injectors of said internal combustion engine responsive to said engine control unit, said injector signal modifier including an internally stored map for modifying a signal from said engine control unit as a function of throttle position and engine RPM, said map including a plurality of cells wherein each one of said plurality of cells corresponds to a given throttle position and given RPM value, said automatic tuning apparatus comprising:

an air-fuel ratio sensor coupled to said engine;

a load device coupled to said engine for controlling the RPM of said engine;

a digital computer coupled to said air-fuel ratio sensor, said digital computer further coupled to said load device for controlling the RPM of said engine; and a display device coupled to said digital computer;

wherein said digital computer is programmed to display a plurality of throttle positions on said display device to an operator of said internal combustion engine, whereby said operator positions said throttle of said internal combustion engine to correspond to said display of said plurality of throttle positions on said display device, and wherein said digital computer is further programmed to vary the RPM of said internal combustion engine by said load device, and wherein said digital computer is further programmed to determine and store corresponding values for said plurality of cells in said stored map of said injector signal modifier.

10. An automatic tuning apparatus for an internal combustion engine, said engine having fuel injectors and a fuel injection control system including an engine control unit, a throttle and an injector signal modifier for controlling said fuel injectors of said internal combustion engine responsive to said engine control unit, said injector signal modifier including an internally stored map far modifying a signal from said engine control unit as a function of throttle position and engine RPM, said map including a plurality of cells wherein each one of said plurality of cells corresponds to a given throttle position and given RPM value, said automatic tuning apparatus comprising:

an air-fuel ratio sensor coupled to said engine;

a load device coupled to said engine for controlling the RPM of said engine;

a digital computer coupled to said air-fuel ratio sensor, said digital computer further coupled to said load device for controlling the RPM of said engine, said digital computer further coupled to said throttle for setting a plurality of throttle positions for said engine; and wherein said digital computer is programmed to set a plurality of throttle positions of said throttle of said internal combustion engine, and wherein said digital computer is further programmed to vary the RPM of said internal combustion engine by said load device, and wherein said digital computer is further programmed responsive to said air-fuel ratio sensor coupled to said engine to determine and store corresponding values for said plurality of cells in said stored map of said injector signal modifier.

* * * * *